United States Patent
Takamoto et al.

(10) Patent No.: US 8,319,863 B2
(45) Date of Patent: Nov. 27, 2012

(54) CHARACTERISTIC VALUE GENERATING CIRCUIT AND IMAGING DEVICE

(75) Inventors: Masaru Takamoto, Kanagawa (JP); Tetsuya Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 12/452,566

(22) PCT Filed: May 25, 2009

(86) PCT No.: PCT/JP2009/059527
§ 371 (c)(1),
(2), (4) Date: Jan. 8, 2010

(87) PCT Pub. No.: WO2009/145143
PCT Pub. Date: Dec. 3, 2009

(65) Prior Publication Data
US 2010/0110255 A1     May 6, 2010

(30) Foreign Application Priority Data

May 27, 2008 (JP) ................................. 2008-138617

(51) Int. Cl.
H04N 9/64 (2006.01)
H04N 5/00 (2011.01)
(52) U.S. Cl. ...................... 348/251; 348/615
(58) Field of Classification Search .................. 348/251, 348/615, E5.034, E5.078; 382/254, 274; 358/461, 518
See application file for complete search history.

(56) References Cited

U.S. PATENT DOCUMENTS
2007/0285552 A1* 12/2007 Kim .............................. 348/335

FOREIGN PATENT DOCUMENTS

| EP | 0 350 328 A2 | 1/1990 |
|---|---|---|
| EP | 0 447 187 A2 | 9/1991 |
| EP | 0 561 599 A2 | 9/1993 |
| JP | 62-164479 U | 10/1987 |
| JP | 02-288687 | 11/1990 |
| JP | 06-141249 | 5/1994 |
| JP | 2003-259238 | 9/2003 |
| JP | 2004-040647 | 2/2004 |

OTHER PUBLICATIONS

International Search Report, International Application No. PCT/JP2009/059527; Dated: Aug. 17, 2009. (Form PCT/ISA/210).
Supplemental European Search Report issued Oct. 10, 2011 for corresponding European Application No. 09 75 4651.

* cited by examiner

*Primary Examiner* — Lin Ye
*Assistant Examiner* — Euel Cowan
(74) *Attorney, Agent, or Firm* — Rader Fishman & Grauer, PLLC

(57) ABSTRACT

The present invention is to provide a characteristic value generating circuit and an imaging device that can generate anticipated variation in the performance of an imaging device due to the individual difference and can easily evaluate the result of correction processing for the variation. A variation generating circuit 30 has a command receiver 31 that acquires characteristic value data S40, a characteristic value generator 33 that refers to the characteristic value data S40 and generates a characteristic value of a limit of correction possibility for input image data S20, and an adder 34 that adds a characteristic limit value S33 generated by the characteristic value generator 33 and the input image data S20.

13 Claims, 11 Drawing Sheets

FIG.2

|  X

Y

| (0,0) | | ⋯ | | (Xa,0) |
|---|---|---|---|---|
| | | | | |
| ⋮ | | (l,m) | | ⋮ |
| | | | | |
| (0,Ya) | | ⋯ | | (Xa,Ya) |

FIG.4

SINGLE DOT

HORIZONTALLY CONTINUOUS

OCCURRENCE OF DEFECTS WITH CERTAIN INTERVAL

VERTICALLY CONTINUOUS

OCCURRENCE OF DEFECTS WITH VERTICAL CERTAIN INTERVAL

OBLIQUELY CONTINUOUS

OCCURRENCE OF DEFECTS WITH OBLIQUE CERTAIN INTERVAL

OCCURRENCE DUE TO OCCURRENCE CAUSE SPECIFIC TO SENSOR, SUCH AS PIXEL ARRANGEMENT (2×2 DEFECTS AS EXAMPLE)

US 8,319,863 B2

CHARACTERISTIC VALUE GENERATING CIRCUIT AND IMAGING DEVICE

TECHNICAL FIELD

The present invention relates to a characteristic value generating circuit and an imaging device that generate variation in the performance of e.g. a CMOS (Complementary Metal Oxide Semiconductor) image sensor.

BACKGROUND ART

Along with increase in the number of pixels of a CMOS image sensor or the like, variation in the performance of the CMOS image sensor due to the individual difference is becoming a problem.

Because of such variation, how noise such as a dot defect occurs also differs by each CMOS image sensor for example. In order to carry out correction suitable for a captured image, adjustment of the correction level of a DSP or the like for executing image processing for an individual CMOS image sensor, and so on, need to be carried out.

The DSP or the like is frequently provided outside the CMOS image sensor or the like. Depending on the degree of the variation, the adjustment of the correction level of the DSP or the like, and so on, fails to be properly carried out in some cases. Therefore, it is useful to know the degree of the variation before the DSP or the like is attached to the CMOS image sensor or the like.

Thus, a sample of variation anticipated in advance is created, and evaluation as to whether or not the DSP or the like can properly correct noise and so on for this sample, and so on, is carried out.

However, it is difficult to create the sample of the variation anticipated in advance, and it is also difficult to carry out strict limit evaluation. In particular, it is very difficult to predict the limit value of the variation (it refers to the maximum variation).

On the other hand, it is possible to correct the variation by a simple operational function inside the CMOS image sensor. However, the correction by the simple operational function frequently has an adverse effect on correction processing by a high-performance DSP or the like.

For example, according to Patent Document 1, an external memory is incorporated in an individual imaging device and the characteristics of the individual imaging device are stored in the memory. At the manufacturing stage, a microcomputer in the individual imaging device reads out the characteristics from the memory and carries out initialization operation suitable for the characteristics. Thereby, correction processing and so on dependent on the individual difference of the individual imaging device can be executed.

PRIOR ART DOCUMENT

Patent Document

Patent Document 1: Japanese Patent Laid-open No. Hei 6-141249

SUMMARY OF THE INVENTION

Technical Problem

For the individual imaging device disclosed in Patent Document 1, it is difficult to execute the correction processing and so on by the device solely. No disclosure is made therein about the method for setting the limit value of variation and so on. Therefore, for example, it is impossible to carry out evaluation about to what extent a DSP or the like can correct variation.

The present invention is to provide a characteristic value generating circuit and an imaging device that can generate anticipated variation in the performance of an imaging device due to the individual difference and can easily evaluate the result of correction processing for the variation.

Technical Solution

A characteristic value generating circuit according to a first aspect of the present invention has an acquirer that acquires reference data, a generator that refers to the reference data and generates a characteristic value of a limit of correction possibility for input image data, and an adder that adds the characteristic value generated by the generator and the input image data.

Preferably, the generator has an extractor that extracts a predetermined parameter from the reference data, and an operation unit that performs predetermined operation based on the predetermined parameter extracted by the extractor and the input image data, and outputs a result of the operation to the adder.

Preferably, the reference data includes data relating to a pixel dot defect. The generator has an address extractor that extracts an address for which the pixel dot defect should be generated from the reference data, and a determiner that determines whether or not the pixel dot defect should be generated for an address extracted by the address extractor. The operation unit performs operation of generating the pixel dot defect for the address if a determination result by the determiner is a determination result indicating that the pixel dot defect should be generated.

Preferably, the extractor extracts the data relating to the pixel dot defect that should be generated from the reference data, and the operation unit performs operation of replacing the input image data by the data relating to the pixel dot defect.

Preferably, the operation unit carries out addition/subtraction of the data relating to the pixel dot defect to/from the input image data.

Preferably, the extractor extracts gain from the reference data, and the operation unit multiplies the input image data by the gain.

Preferably, the reference data includes image data obtained by executing predetermined processing for the input image data. The extractor extracts gain of the signal level of each color from the image data obtained by executing the predetermined processing. The operation unit multiplies the image data by the gain of each color.

Preferably, the reference data includes image data obtained by executing predetermined processing for the input image data. The generator has a coordinate setter that sets the coordinate of the center of shading of the image data obtained by executing the predetermined processing, and a weighting processor that executes weighting processing dependent on the distance from the coordinate set by the coordinate setter. The extractor extracts the gap amount between the signal level of the input image data and the signal level of the image data obtained by executing the predetermined processing. The operation unit multiplies a result of weighting processing by the weighting processor by the ratio of the gap amount by the extractor.

Preferably, the weighting processor executes weighting processing by linear interpolation for each address in such a way that a weighting amount is 0 at the coordinate of the center of the shading and a weighting amount is the same value at both ends of the shading.

An imaging device according to a second aspect of the present invention has a pixel unit that converts incident light to a charge by photoelectric conversion, a characteristic value generating circuit that is capable of generating a limit value of a characteristic of the pixel unit, and a signal processor that executes predetermined processing for an output signal of the pixel unit and outputs a processing result as input image data to the characteristic value generating circuit. The characteristic value generating circuit has an acquirer that acquires reference data, a generator that refers to the reference data and generates a characteristic value of a limit of correction possibility for input image data, and an adder that adds the characteristic value generated by the generator and the input image data.

According to the present invention, the acquirer acquires the reference data, and the generator refers to the reference data and generates a characteristic value of a limit of correction possibility for the input image data. The adder adds the characteristic value and the input image data.

Advantageous Effect

According to the present invention, anticipated variation in the performance of an imaging device due to the individual difference can be generated, and the result of correction processing for the variation can be easily evaluated.

BRIEF DESCRIPTION OF DRAWINGS

FIG. 2 is a diagram for explaining addresses according to a first embodiment.

BEST MODES FOR CARRYING OUT THE INVENTION

Embodiments of the present invention will be described below in association with the drawings.

First Embodiment

A first embodiment will be described with reference to FIGS. 1 to 6.

Figure 1:
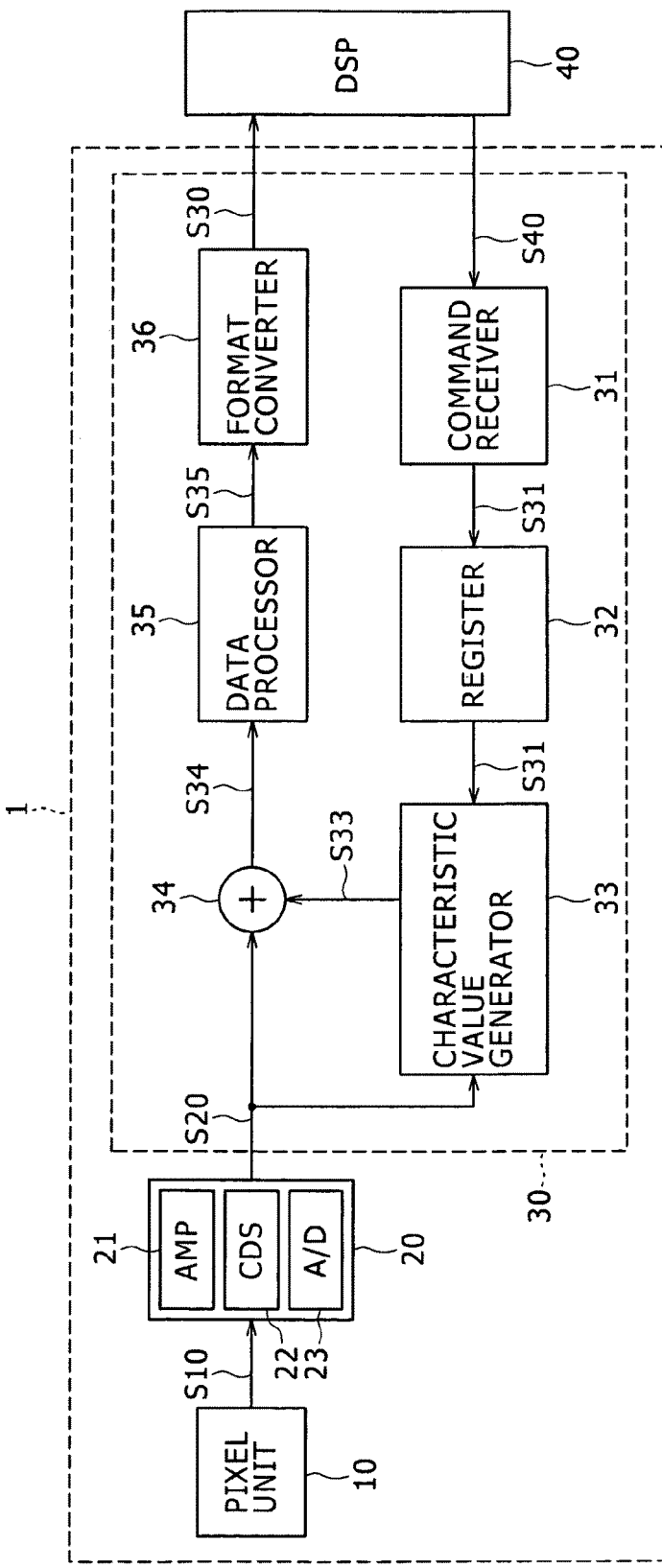
FIG. 1 is a block diagram of major part, showing a configuration example of a CMOS image sensor employing a correction circuit according to the present invention.

FIG. 1 is a block diagram of major part, showing a configuration example of a CMOS image sensor employing a correction circuit according to the present invention.

As shown in FIG. 1, a CMOS image sensor 1 as an imaging device has a pixel unit 10, an analog front-end unit (signal processor) 20, and a variation generating circuit 30 as a characteristic value generating circuit.

A DSP (Digital Signal Processor) 40 is connected to the variation generating circuit 30 in the CMOS image sensor 1.

In the pixel unit 10, $Xa$ (row)×$Ya$ (column) pixel circuits (not shown) are so arranged as to correspond to a color filter of e.g. the Bayer array. For example, $Xa=2048$ and $Ya=2048$.

Each of the pixel circuits generates a charge (electrons) dependent on the light amount of incident light by photoelectric conversion and accumulates this charge for a predetermined period (referred to as the charge accumulation period). After the charge accumulation period, the pixel unit 10 outputs the accumulated charge as a voltage signal S10 to the analog front-end unit 20.

The analog front-end unit 20 is composed of an amplifier circuit (AMP) 21, a CDS circuit (Correlated Double Sampling; CDS) 22, and an A/D conversion circuit (A/D) 23.

Upon input of the voltage signal S10 from the pixel unit 10 to the analog front-end unit 20, the amplifier circuit 21 amplifies this voltage signal S10.

At the time, the CDS circuit 22 removes reset noise, amplification noise, and so on included in the voltage signal S10.

The A/D conversion circuit 23 converts the analog voltage signal from which these noises are removed into a digital voltage signal.

In this manner, the analog front-end unit 20 executes predetermined processing for the analog voltage signal S10 to produce the digital voltage signal, and outputs this voltage signal as image data (input image data) S20 to a characteristic value generator 33 and an adder 34 in the variation generating circuit 30.

Figure 2:
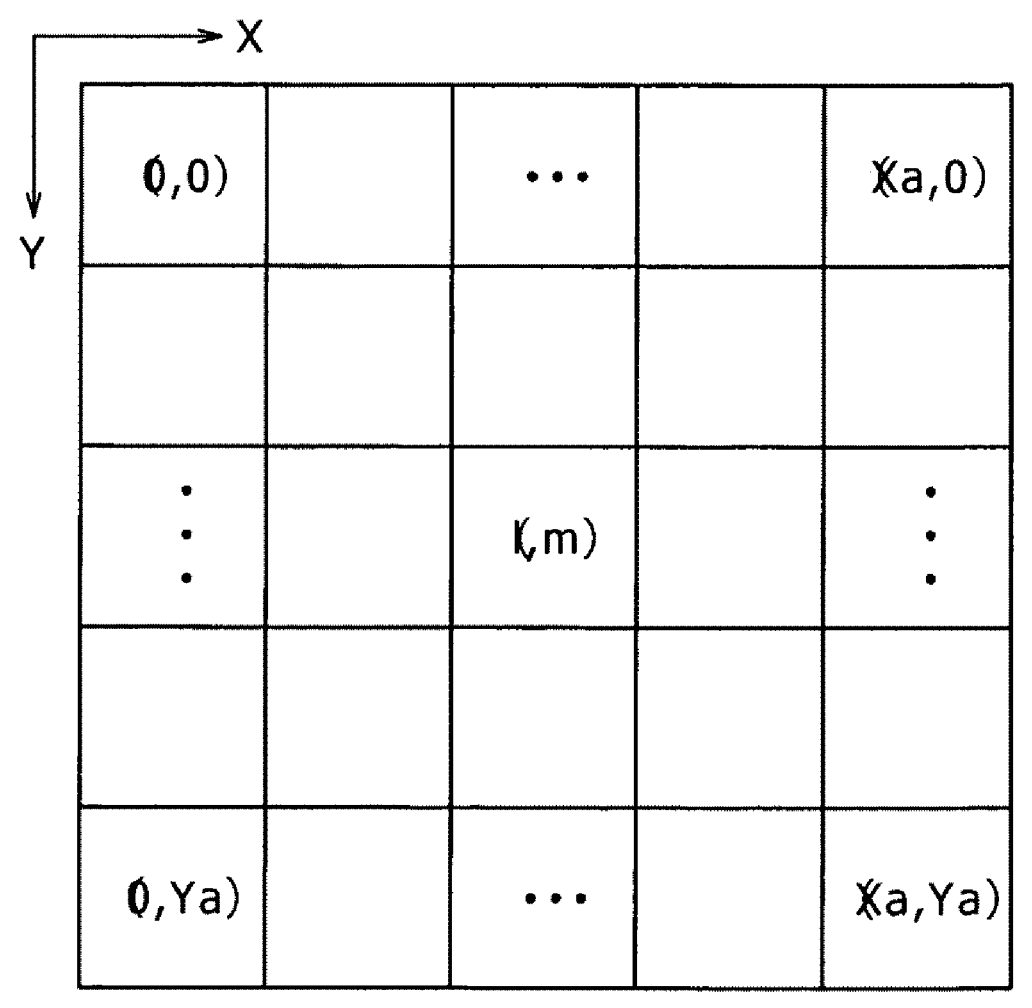

FIG. 2 is a conceptual diagram for explaining addresses according to the first embodiment.

Suppose that the image data S20 is image data obtained by one time of electronic shuttering. In this case, the image data S20 of one frame is composed of image data from $Xa×Ya$ pixel circuits.

Suppose that the image data obtained from $Xa×Ya$ pixel circuits are arranged along the X-axis and Y-axis directions. An arbitrary address (l, m) corresponds to the data output from the pixel circuit on the l-th row and the m-th column. Note that $l=0, 1, \ldots, Xa$ and $m=0, 1, \ldots, Ya$.

Not only the image data S20 but also characteristic value data to be described later and so on is composed of data corresponding to the number of pixel circuits. That is, the respective components such as the analog front-end unit 20 and the variation generating circuit 30 to be described later each execute processing for each address.

By the way, the CMOS image sensor 1 involves variation in the performance due to the individual difference. The variation generating circuit 30 has a function to generate anticipated variation in the performance of the CMOS image sensor 1 (referred to also simply as "variation") based on characteristic value data (reference data) S40 input from the DSP 40.

This variation includes the maximum variation that is anticipated to be possibly generated by the CMOS image sensor 1. Note that, in the first embodiment, the variation refers to one relating to e.g. a dot defect due to the pixel circuit, i.e. the occurrence of a white dot at one part (one point) of an image.

The components of the variation generating circuit 30, which is a feature of the present embodiment, will be described.

The variation generating circuit 30 has a command receiver (acquirer) 31, a register 32, the characteristic value generator (generator) 33, the adder 34, a data processor 35, and a format converter 36.

The variation generating circuit 30 makes variation be overlaid (overlapped) on the image data S20 to thereby produce sample image data S30 including anticipated variation.

In the characteristic value data S40, data relating to the condition of the generation of the variation for the image data S20 is included. This condition can be favorably set.

Upon receiving the encoded characteristic value data S40 from the DSP 40, the command receiver 31 decodes the characteristic value data S40 and outputs the decoded characteristic value data as characteristic value data S31 to the register 32.

Upon input of the characteristic value data S31 from the command receiver 31 to the register 32, the register 32 stores the characteristic value data S31. The register 32 outputs the characteristic value data S31 to the characteristic value generator 33 in accordance with instructions by a timing generator (not shown).

Upon reading out the characteristic value data S31 from the register 32, the characteristic value generator 33 refers to the characteristic value data S31 and generates variation for the image data S20 input from the analog front-end unit 20. The characteristic value generator 33 outputs this variation as a characteristic limit value (characteristic value) S33 to the adder 34.

The adder 34 adds the image data S20 input from the analog front-end unit 20 and the characteristic limit value S33 input from the characteristic value generator 33. In other words, the adder 34 makes the variation be overlaid on the image data S20. The adder 34 outputs the data arising from the addition as an addition result S34 to the data processor 35.

The data processor 35 executes predetermined data processing for the addition result S34 input from the adder 34 and outputs the processing result as processed data S35 to the format converter 36.

Upon input of the processed data S35 from the data processor 35 to the format converter 36, the format converter 36 coverts the processed data S35 into the format type corresponding to the output format and outputs the converted data as the sample image data S30 including the variation to the DSP 40.

The DSP 40 outputs the characteristic value data S40 including the mode of the dot defect, the level (gain) of the defect, address information, and so on to the command receiver 31 in the variation generating circuit 30.

Upon input of the sample image data S30 from the format converter 36 to the DSP 40, the DSP 40 executes, for the sample image data S30, white balance processing, RGB conversion, YUV conversion, shading correction, parameter correction relating to the image defect, and so on.

The output result by the DSP 40 is displayed on a display or the like. Thereby, the correction degree, i.e. to what extent the sample image data S30 involving the variation is corrected, can be checked. In addition, the limit value of the variation that can be corrected by the DSP 40 can be checked.

Details of the above-described characteristic value generator 33 will be described with reference to FIG. 3 and FIG. 4.

Figure 3:
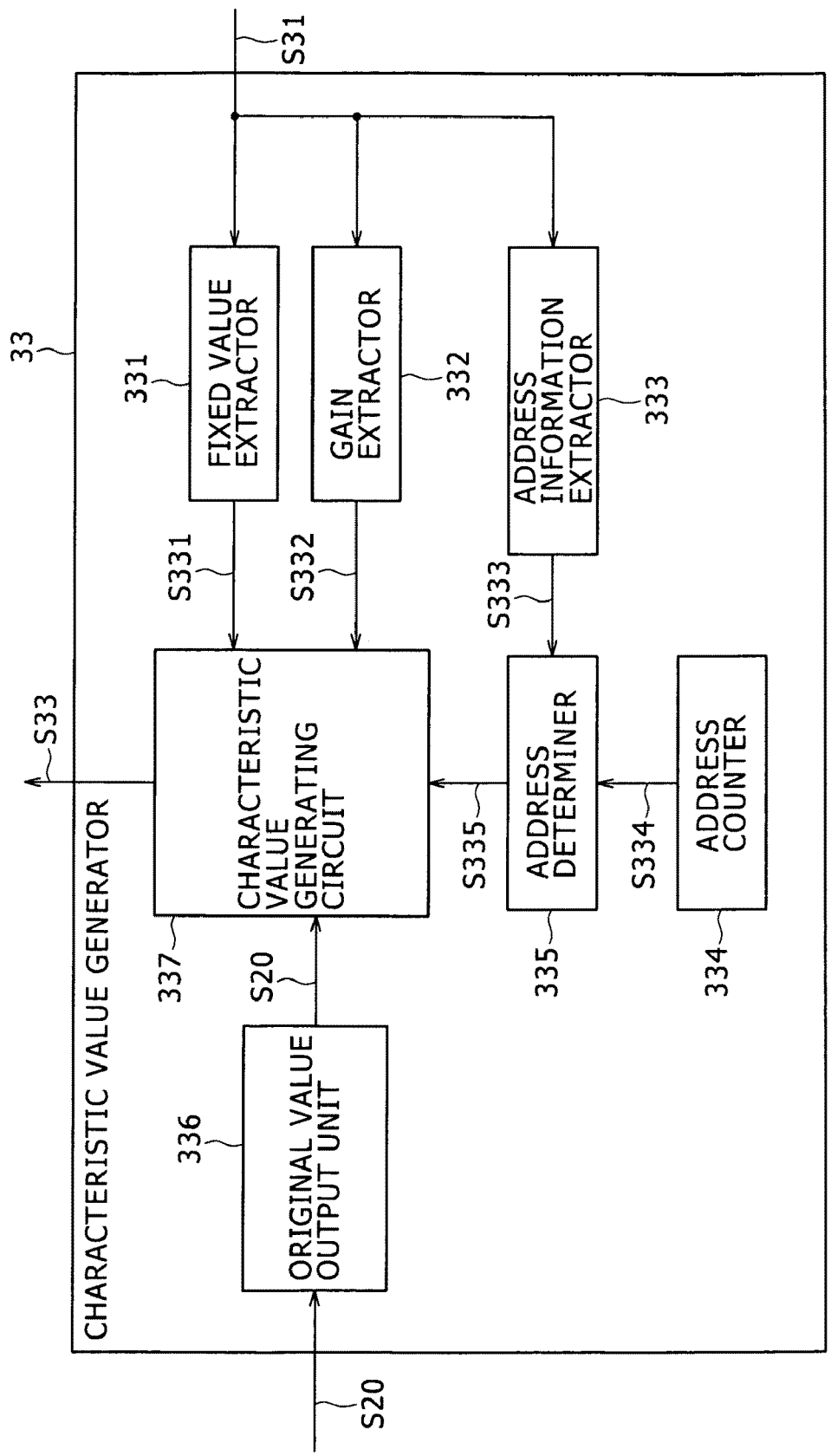
FIG. 3 is a block diagram showing a detailed configuration example of a characteristic value generator according to the first embodiment.
Figure 4A:
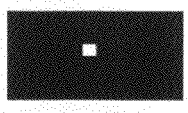
FIG. 4 is a diagram for explaining characteristic value data according to the first embodiment.
Figure 4B:
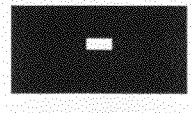
Figure 4C:
Figure 4D:
Figure 4E:
Figure 4F:
Figure 4G:
Figure 4H:

FIG. 3 is a block diagram showing a detailed configuration example of the characteristic value generator according to the first embodiment.

FIG. 4 is a diagram for explaining the characteristic value data according to the first embodiment.

As shown in FIG. 3, the characteristic value generator 33 is composed of a fixed value extractor 331, a gain extractor 332, an address information extractor (address extractor) 333, an address counter 334, an address determiner (determiner) 335, an original value output unit 336, and a characteristic value generating circuit (operation unit) 337. The extractor of the present invention is configured by the fixed value extractor 331 and the gain extractor 332.

The mode of the dot defect, the level (gain) of the defect, and address information are included in the characteristic value data S31, i.e. the characteristic value data S40 output from the DSP 40.

The modes of the dot defect include the following modes: a single type mode ((A) of FIG. 4) in which a white dot is generated at one point of an image; a horizontally-continuous type mode ((B) of FIG. 4) in which white dots are continuous along the X-axis direction; a horizontal type mode ((C) of FIG. 4) in which white dots are generated with certain intervals along the X-axis direction; and a vertically-continuous type mode ((D) of FIG. 4) in which white dots are continuously generated along the Y-axis direction.

In addition, the modes of the dot defect include the following modes: a vertical type mode ((E) of FIG. 4) in which white dots are generated with certain intervals along the Y-axis direction; an obliquely-continuous type mode ((F) of FIG. 4) in which white dots are continuously generated along an oblique direction; an oblique type mode ((G) of FIG. 4) in which white dots are generated with certain intervals; and an image-sensor-specific type mode ((H) of FIG. 4) based on reasons such as the pixel arrangement.

In the address information, information relating to whether or not variation (dot defect) should be generated and information relating to the method for generating the variation are included on an address-by-address basis.

The characteristic value data S31 stored in the register 32 is read out from the register 32 in accordance with instructions by the timing generator (not shown) and output to the fixed value extractor 331, the gain extractor 332, and the address information extractor 333.

Upon input of the characteristic value data S31 from the register 32 to the fixed value extractor 331, the fixed value extractor 331 extracts the mode included in the characteristic value data S31 and outputs this mode as a fixed value S331 to the characteristic value generating circuit 337. This mode is any of the modes shown in (A) to (H) of FIG. 4.

Upon input of the characteristic value data S31 from the register 32 to the gain extractor 332, the gain extractor 332 extracts the gain included in the characteristic value data S31 and outputs this gain as gain S332 to the characteristic value generating circuit 337.

Upon input of the characteristic value data S31 from the register 32 to the address information extractor 333, the address information extractor 333 extracts the address information from the characteristic value data S31 and outputs this address information as address information S333 to the address determiner 335.

The address counter 334 sequentially counts the address from address (0, 0) to address (Xa, Ya) (see FIG. 2) and sequentially outputs the counted address (l, m) as an address count value S334 to the address determiner 335.

To the address determiner 335, the address information S333 is input from the address information extractor 333 and the address count value S334 is input from the address counter 334. The address determiner 335 checks the address information S333 against the address count value S334.

Specifically, the address determiner 335 refers to the address information S333 of address (l, m) and determines whether or not to generate variation for address (l, m). The address determiner 335 outputs a determination result S335 to the characteristic value generating circuit 337 on an address-by-address basis. In this determination result, information relating to the method for generating the variation is also included.

The original value output unit 336 outputs, to the characteristic value generating circuit 337, the image data S20 input from the analog front-end unit 20.

To the characteristic value generating circuit 337, the fixed value S331, the gain S332, and the image data S20 are input from the fixed value extractor 331, the gain extractor 332, and the original value output unit 336, respectively. To the characteristic value generating circuit 337, the determination result S335 is sequentially input from the address determiner 335 on an address-by-address basis.

The characteristic value generating circuit 337 refers to the determination result S335, and does not generate the characteristic limit value S33 for address (l, m) if the determination result S335 for address (l, m) is a determination result indicating generation of no variation. In this case, the characteristic limit value S33 is not input to the adder 34.

On the other hand, with reference to the determination result S335 for address (l, m), the characteristic value generating circuit 337 makes variation be overlaid for address (l, m) if the determination result S335 is a determination result indicating generation of the variation.

In this case, the characteristic value generating circuit 337 executes any processing among first to third processing to be described below depending on the information relating to the method for generating variation, included in the determination result S335. For convenience of description, suppose that the fixed value S331 for address (l, m) is a dot defect (the single type mode shown in (A) of FIG. 4).

(First Processing)

The first processing is processing for the case in which the information relating to the method for generating variation indicates replacement of the image data S20 by the fixed value S331.

The characteristic value generating circuit 337 outputs, to the adder 34, the value obtained by subtracting the image data S20 from the fixed value S331 (S331−S20) as the characteristic limit value S33 for address (l, m).

For address (l, m), the adder 34 adds the image data S20 input from the analog front-end unit 20 and the characteristic limit value S33 (S20+(S331−S20)). Thereby, the addition result S34 for address (l, m) becomes the value obtained by replacing the image data S20 by the fixed value S331 (dot defect).

(Second Processing)

The second processing is processing for the case in which the information relating to the method for generating variation indicates addition of the fixed value S331 to the image data S20.

The characteristic value generating circuit 337 outputs the fixed value S331 as the characteristic limit value S33 to the adder 34 for address (l, m).

For address (l, m), the adder 34 adds the image data S20 input from the analog front-end unit 20 and the characteristic limit value S33 (S20+S331). Thereby, the addition result S34 for address (l, m) becomes the value obtained by adding the fixed value S331 (dot defect) to the image data S20.

However, if the sign of the fixed value S331 is negative, the addition result S34 becomes the value obtained by subtracting the fixed value S331 from the image data S20.

(Third Processing)

The third processing is processing for the case in which the information relating to the method for generating variation indicates change in the gain of the image data S20 and addition of the fixed value S331 to the image data S20.

The characteristic value generating circuit 337 outputs, to the adder 34, the value obtained by multiplying the image data S20 by the gain S332 (S20×S332) as the characteristic limit value S33 for address (l, m).

For address (l, m), the adder 34 adds the image data S20 input from the analog front-end unit 20 and the characteristic limit value S33 ((S20×S332)+S20). Thereby, the addition result S34 for address (l, m) becomes the value obtained by adding the fixed value S331 (dot defect) to the image data S20 multiplied by the gain.

However, in the case of the negative gain S332, the addition result S34 becomes the value obtained by adding the fixed value S331 to the image data S20 multiplied by the negative gain.

In this manner, the characteristic value generating circuit 337 executes the first to third processing depending on the information relating to the method for generating variation, and thereby can carry out verification suitable for the defect that is desired to be checked, such as verification of correction of a defect at the absolute level and verification of correction of a defect having dependence on the light amount.

An operation example of the CMOS image sensor 1 employing the variation generating circuit 30 will be described in association with FIG. 5.

Figure 5:
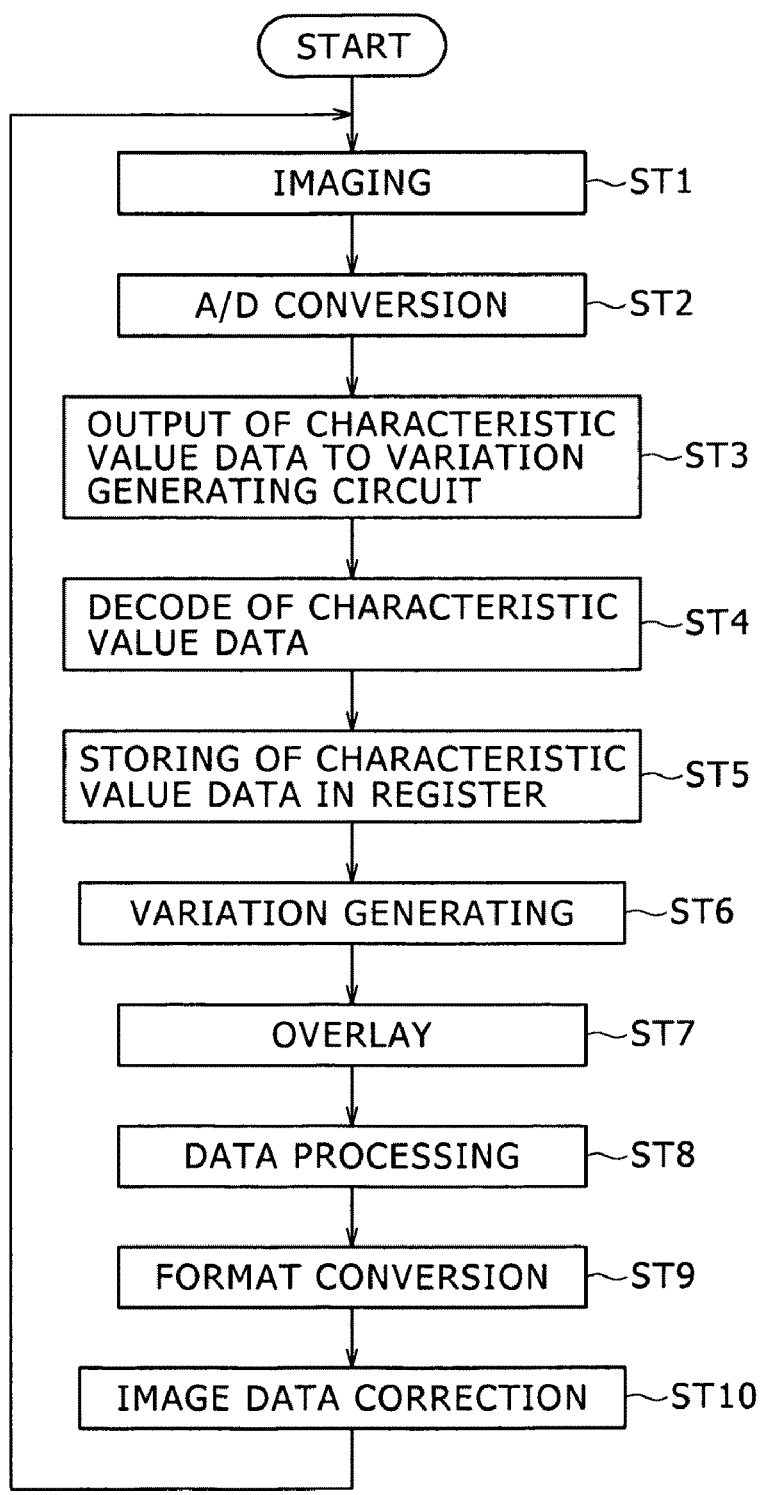
FIG. 5 is a flowchart showing an operation example of a CMOS image sensor according to the first embodiment.

FIG. 5 is a flowchart showing the operation example of the CMOS image sensor according to the first embodiment.

(Step ST1)

As shown in FIG. 5, each of the pixel circuits in the pixel unit 10 generates the charge dependent on the light amount of incident light by photoelectric conversion and accumulates this charge for a predetermined period. After the charge accumulation period, the pixel unit 10 outputs the accumulated charge as the voltage signal S10 to the analog front-end unit 20.

(Step ST2)

The analog front-end unit 20 executes predetermined processing for the analog voltage signal S10 to produce a digital voltage signal, and outputs this voltage signal as the image data S20 to the adder 34 and the characteristic value generator 33 in the variation generating circuit 30.

(Step ST3)

The DSP 40 outputs the characteristic value data S40 including the mode of the dot defect, the level (gain) of the defect, the address information, and so on to the command receiver 31 in the variation generating circuit 30.

(Step ST4)

Upon receiving the encoded characteristic value data S40 from the DSP 40, the command receiver 31 decodes the characteristic value data S40 and outputs the decoded characteristic value data as the characteristic value data S31 to the register 32.

(Step ST5)

Upon input of the characteristic value data S31 from the command receiver 31 to the register 32, the register 32 stores the characteristic value data S31. The register 32 outputs the characteristic value data S31 to the characteristic value generator 33 in accordance with instructions by the timing generator.

(Step ST6)

Upon reading out the characteristic value data S31 from the register 32, the characteristic value generator 33 refers to the characteristic value data S31 and generates variation for the image data S20 input from the analog front-end unit 20. The characteristic value generator 33 outputs this variation as the characteristic limit value S33 to the adder 34.

(Step ST7)

The adder 34 adds the image data S20 input from the analog front-end unit 20 and the characteristic limit value S33 input from the characteristic value generator 33. In other words, the adder 34 makes the variation be overlaid on the original image data S20. The adder 34 outputs the data arising from the addition as the addition result S34 to the data processor 35.

(Step ST8)

The data processor 35 executes predetermined data processing for the addition result S34 input from the adder 34 and outputs the processing result as the processed data S35 to the format converter 36.

(Step ST9)

Upon input of the processed data S35 from the data processor 35 to the format converter 36, the format converter 36 coverts the processed data S35 into the format type corresponding to the output format and outputs the converted data as the sample image data S30 including the variation to the DSP 40.

(Step ST10)

Upon input of the sample image data S30 from the format converter 36 to the DSP 40, the DSP 40 executes, for the sample image data S30, white balance processing, RGB conversion, YUV conversion, shading correction, parameter correction relating to the image defect, and so on.

Thereafter, the processing of the step ST1 is restarted according to need.

A detailed operation example of the characteristic value generator 33 will be described in association with FIG. 6.

Figure 6:
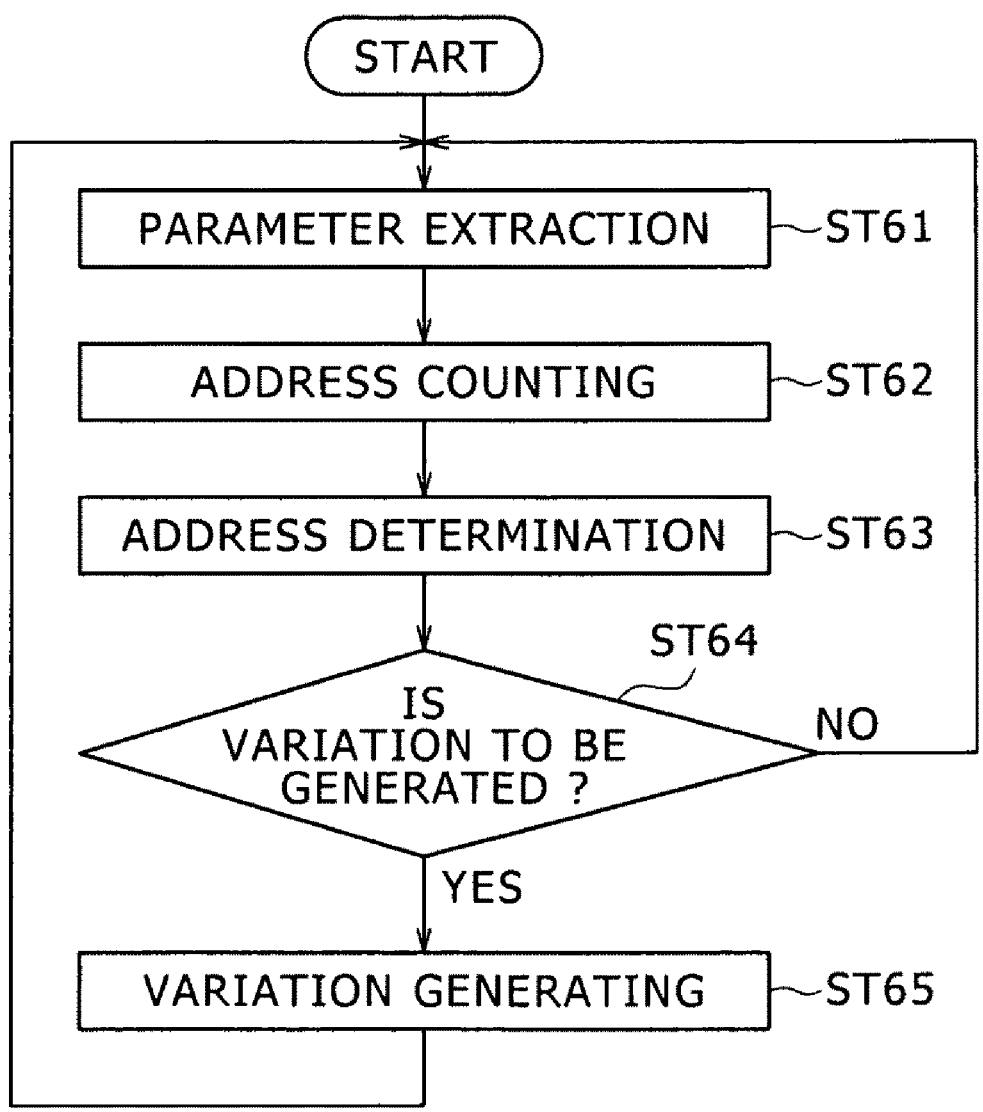
FIG. 6 is a flowchart showing a detailed operation example of the characteristic value generator according to the first embodiment.

FIG. 6 is a flowchart showing the detailed operation example of the characteristic value generator according to the first embodiment.

The operation for address (l, m) will be described based on the assumption that the fixed value S331 is in e.g. the single type mode shown in (A) of FIG. 4.

(Step ST61)

The characteristic value data S31 stored in the register 32 is read out from the register 32 in accordance with instructions by the timing generator and output to the fixed value extractor 331, the gain extractor 332, and the address information extractor 333.

Upon input of the characteristic value data S31 from the register 32 to the fixed value extractor 331, the fixed value extractor 331 extracts the mode included in the characteristic value data S31 and outputs this mode as the fixed value S331 to the characteristic value generating circuit 337.

Upon input of the characteristic value data S31 from the register 32 to the gain extractor 332, the gain extractor 332 extracts the gain included in the characteristic value data S31 and outputs this gain as the gain S332 to the characteristic value generating circuit 337.

Upon input of the characteristic value data S31 from the register 32 to the address information extractor 333, the address information extractor 333 extracts the address information from the characteristic value data S31 and outputs this address information as the address information S333 to the address determiner 335.

The original value output unit 336 outputs, to the characteristic value generating circuit 337, the image data S20 input from the analog front-end unit 20.

(Step ST62)

The address counter 334 sequentially counts the address from address (0, 0) to address (Xa, Ya) (see FIG. 2) and outputs the counted address (l, m) as the address count value S334 to the address determiner 335.

(Step ST63)

To the address determiner 335, the address information S333 is input from the address information extractor 333 and the address count value S334 is input from the address counter 334. The address determiner 335 checks the address information S333 against the address count value S334.

Specifically, the address determiner 335 refers to the address information S333 of address (l, m) and determines whether or not to generate variation for address (l, m). The address determiner 335 outputs the determination result S335 to the characteristic value generating circuit 337 on an address-by-address basis.

(Step ST64)

To the characteristic value generating circuit 337, the fixed value S331, the gain S332, and the image data S20 are input from the fixed value extractor 331, the gain extractor 332, and the original value output unit 336, respectively. To the characteristic value generating circuit 337, the determination result S335 for address (l, m) is input from the address determiner 335.

The characteristic value generating circuit 337 refers to the determination result S335, and does not generate the characteristic limit value S33 for address (l, m) if the determination result S335 for address (l, m) is a determination result indicating generation of no variation (NO). Thereafter, the processing of the step ST61 is executed for the next address.

On the other hand, with reference to the determination result S335 for address (l, m), the characteristic value generating circuit 337 makes variation be overlaid for address (l, m) if the determination result S335 is a determination result indicating generation of the variation (YES).

(Step ST65)

If the information relating to the method for generating variation indicates replacement of the image data S20 by the fixed value S331, the characteristic value generating circuit 337 outputs, to the adder 34, the value obtained by subtracting the image data S20 from the fixed value S331 (S331−S20) as the characteristic limit value S33 for address (l, m).

For address (l, m), the adder 34 adds the image data S20 input from the analog front-end unit 20 and the characteristic limit value S33 (S20+(S331−S20)). Thereby, the addition result S34 for address (l, m) becomes the value obtained by replacing the image data S20 by the fixed value S331.

If the information relating to the method for generating variation indicates addition of the fixed value S331 to the image data S20, the fixed value S331 is output as the characteristic limit value S33 to the adder 34 for address (l, m).

For address (l, m), the adder 34 adds the image data S20 input from the analog front-end unit 20 and the characteristic limit value S33 (S20+S331). Thereby, the addition result S34 for address (l, m) becomes the value obtained by adding the fixed value S331 to the image data S20.

If the information relating to the method for generating variation indicates change in the gain of the image data S20 and addition of the fixed value S331 to the image data S20, the characteristic value generating circuit 337 outputs, to the adder 34, the value obtained by multiplying the image data S20 by the gain S332 (S20×S332) as the characteristic limit value S33 for address (l, m).

For address (l, m), the adder 34 adds the image data S20 input from the analog front-end unit 20 and the characteristic limit value S33 ((S20×S332)+S332). Thereby, the addition result S34 for address (l, m) becomes the value obtained by adding the fixed value S331 to the image data S20 multiplied by the gain.

Thereafter, the processing of the step ST61 is executed for the next address.

If the fixed value S331 is in the horizontally-continuous type mode shown in (B) of FIG. 4, the processing of the steps ST61 to ST65 is executed for address (l+l, m). Also in another mode, the processing of the steps ST61 to ST65 is executed for the addresses for which a dot defect is desired to be generated.

The present embodiment can be applied to not only the dot defect but also the line defect. In this case, the processing of the steps ST61 to ST65 is executed for e.g. addresses (0, 0) to (0, Ya).

As described in the above details, according to the first embodiment, the variation generating circuit 30 has the command receiver 31 that acquires the characteristic value data S40, the characteristic value generator 33 that refers to the characteristic value data S40 and generates the characteristic value of the limit of the correction possibility for the input image data S20, and the adder 34 that adds the characteristic limit value S33 generated by the characteristic value generator 33 and the input image data S20.

Thereby, anticipated variation in the performance of the CMOS image sensor or the like due to the individual difference can be generated and the result of the correction processing for the variation can be easily evaluated.

Conventionally, the cost to create a sample of the anticipated variation is separately incurred. In contrast, an advantage that the sample of the variation does not need to be separately created is achieved by the present embodiment. The evaluation of the DSP at the limit of the variation is conventionally difficult. In contrast, the present embodiment makes it easy to evaluate the characteristics of the whole of the CMOS image sensor, including the DSP.

Along with change in the production condition of the CMOS image sensor or the like, the content (characteristic) of generated variation also changes. However, the present embodiment permits rapid responding to evaluation of various kinds of variation without suffering from the influence of the change in the production condition.

It is also possible to evaluate the limit of the correctable range of the DSP easily and quantitatively. This allows feedback of the evaluation of the DSP to the production of the CMOS image sensor or the like.

According to the present embodiment, variation can be generated with specification of the address and this variation can be overlaid on the original image data. This makes it easy to carry out (positional) adjustment of the pixel area (pixel unit) on the output side.

For example, it is possible to, by generating a dot defect at the center of the pixel area, easily check the state such as whether or not the center of the pixel area corresponds with the center of the display based on the dot defect displayed on the display. In particular, in cutting out the pixel area, the correlation between the center coordinates of the physical pixel area and the output to the display can be easily checked.

Second Embodiment

Regarding a second embodiment, points different from the first embodiment will be mainly described with reference to FIG. 7 and FIG. 8.

Figure 7:
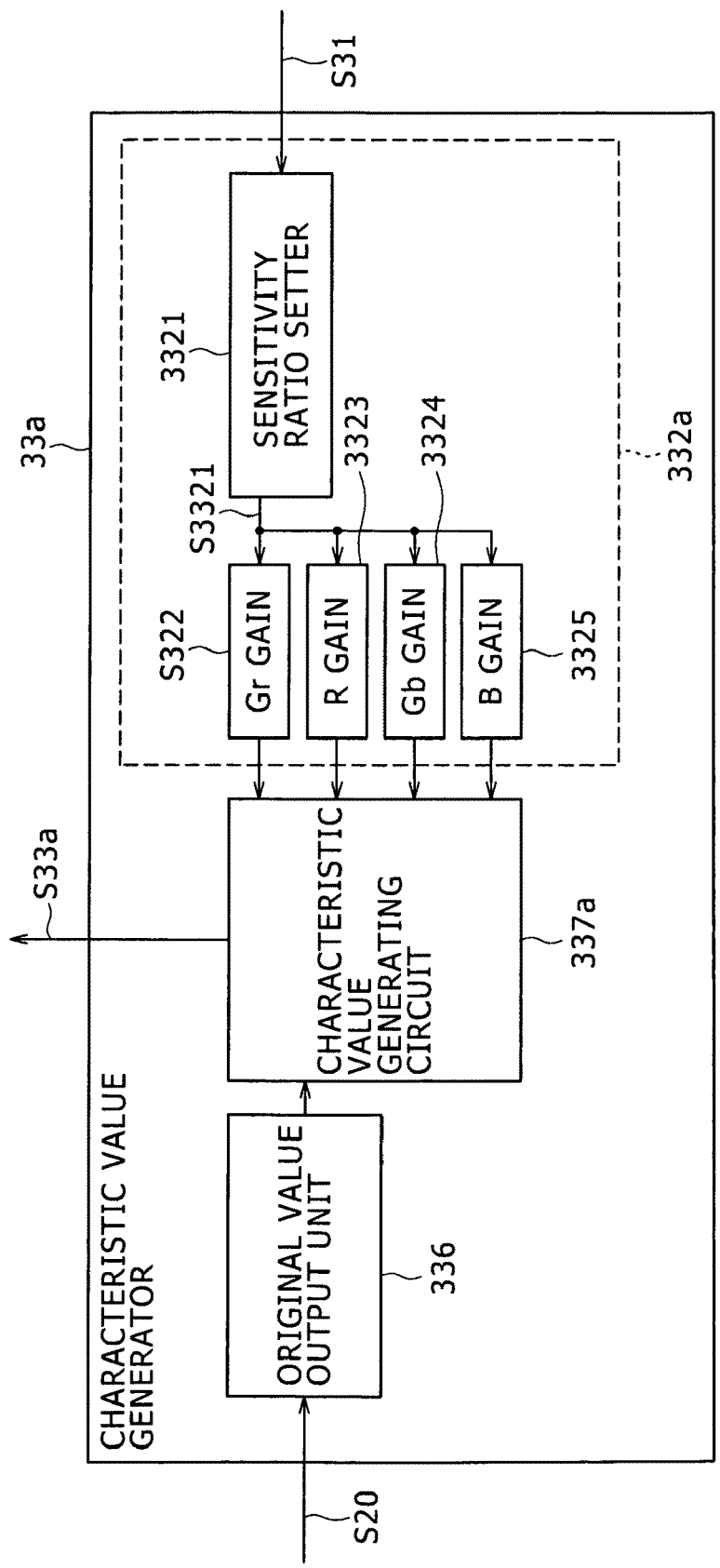
FIG. 7 is a block diagram showing a detailed configuration example of a characteristic value generator according to a second embodiment.

FIG. 7 is a block diagram showing a detailed configuration example of the characteristic value generator according to the second embodiment.

In the second embodiment, a characteristic value generator 33a generates variation in the sensitivity ratio while maintaining the sensitivity of the whole of the image data S20.

As shown in FIG. 7, the characteristic value generator 33a is composed of a gain extractor 332a, the original value output unit 336, and a characteristic value generating circuit 337a.

The gain extractor 332a is composed of a sensitivity ratio setter 3321 and gain output units 3322 to 3325.

Upon input of the characteristic value data S31 from the register 32 to the sensitivity ratio setter 3321, the sensitivity ratio setter 3321 sets the gains corresponding to colors of R (red), Gr (green), Gb (green), and B (blue) based on the characteristic value data S31. Gr (green) and Gb (green) are different colors.

Note that this gain is such a value that the sensitivity of the image does not change even after processing by the variation generating circuit 30. The characteristic value data S31 is data obtained by imaging by the pixel unit 10 and processing by the DSP 40.

Here, the method for setting the gain by the sensitivity ratio setter 3321 will be described. The sensitivity ratio is defined by the ratio of the color signal level, e.g. by R/Gr. Evaluation is so made that the sensitivity ratio of the CMOS image sensor 1 is 60% (=R/Gr) and the light value of the sensitivity ratio (variation) is 70%.

In this case, in order that the sensitivity of the entire image may not change even after processing by the variation generating circuit 30, the gain of R and the gain of Gr satisfy the following Equation (1) and Equation (2).

(Formula 1)

$$(R \times (1+\text{Gain}R))/(Gr \times (1+\text{Gain}Gr)) = 70/100 \qquad (1)$$

(Formula 2)

$$R+Gr = (R \times (1+\text{Gain}R)) + (Gr \times (1+\text{Gain}Gr)) \qquad (2)$$

In Equations (1) and (2), GainR denotes the gain of R, and GainGr denotes the gain of Gr. Equation (1) shows the condition of the sensitivity ratio of the CMOS image sensor 1, and Equation (2) shows the condition of the case in which the sensitivity of the entire image does not change even after processing by the variation generating circuit 30.

From Equation (1) and Equation (2), the gain of R is calculated as GainR=5/51, and the gain of Gr is calculated as GainGr=−1/17. In a similar manner, the gain of B and so on is also calculated.

Like in the above-described example, the gain set by the sensitivity ratio setter 3321 may be a negative gain. If the gain is negative, this indicates the lowering of the sensitivity. The characteristic that the setting range of the gain encompasses negative values in this manner is a feature of the present embodiment.

The sensitivity ratio setter 3321 outputs, to the gain output units 3322 to 3325, the gains calculated on a color-by-color basis as set values S3321.

Upon the input of the set values S3321 from the sensitivity ratio setter 3321 to the gain output units 3322 to 3325, the gain output units 3322 to 3325 extract the gains on a color-by-color basis based on the set values S3321 and output the gains to the characteristic value generating circuit 337a.

At this time, the gain output unit 3322 extracts the gain Gr of Gr. The gain output unit 3323 extracts the gain R of R. The gain output unit 3324 extracts the gain Gb of Gb. The gain output unit 3325 extracts the gain B of B.

Upon input of the gain of each color from the gain output units 3322 to 3325 to the characteristic value generating circuit 337a, the characteristic value generating circuit 337a outputs, to the adder 34, the values obtained by multiplying the image data S20 input from the original value output unit 336 by the gains corresponding to the respective colors (e.g. gain Gr×S20) as characteristic limit values S33a.

The adder 34 adds the image data S20 input from the analog front-end unit 20 and the characteristic limit values S33a (S20+gain Gr×S20).

Thereby, with variation obtained by changing the sensitivity ratio R/Gr from 60% to 70% for example with the sensitivity of the whole of the image data S20 maintained, the limit of variation in the CMOS image sensor 1 can be evaluated by the DSP 40.

A detailed operation example of the characteristic value generator 33a will be described in association with FIG. 8.

Figure 8:
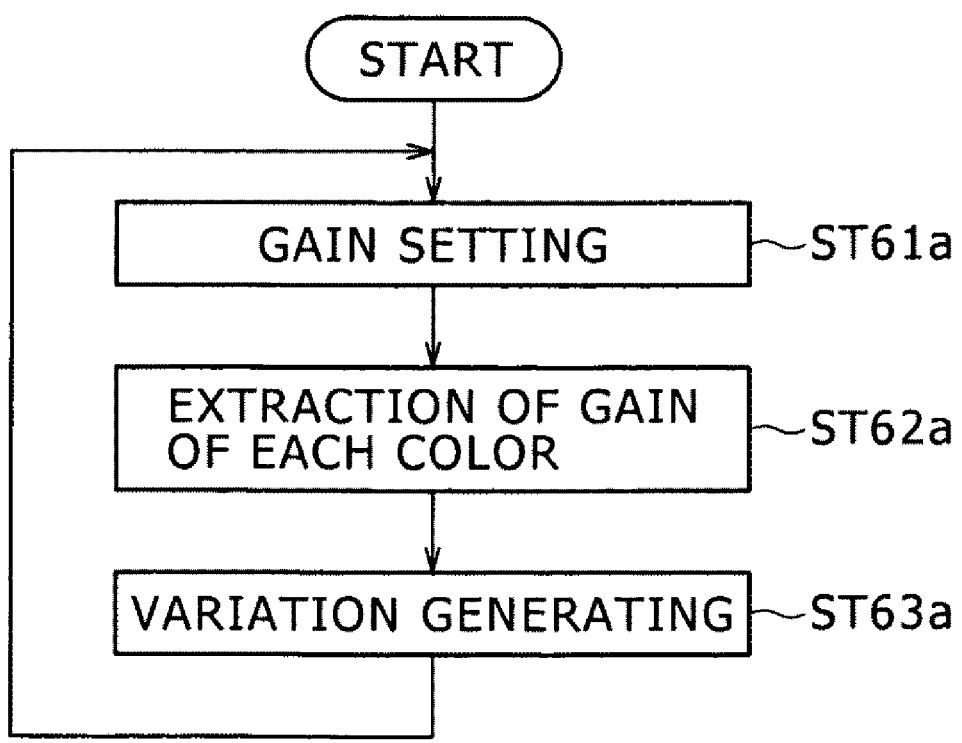
FIG. 8 is a flowchart showing a detailed operation example of the characteristic value generator according to the second embodiment.

FIG. 8 is a flowchart showing the detailed operation example of the characteristic value generator according to the second embodiment.

(Step ST61a)

As shown in FIG. 8, upon input of the characteristic value data S31 from the register 32 to the sensitivity ratio setter 3321, the sensitivity ratio setter 3321 sets the gains corresponding to colors of R (red), Gr (green), Gb (green), and B (blue).

The sensitivity ratio setter 3321 outputs, to the gain output units 3322 to 3325, the gains calculated on a color-by-color basis as the set values S3321.

(Step ST62a)

Upon input of the set values S3321 from the sensitivity ratio setter 3321 to the gain output units 3322 to 3325, the gain output units 3322 to 3325 extract the gains on a color-by-color basis based on the set values S3321 and output the gains to the characteristic value generating circuit 337a.

(Step ST63a)

Upon input of the gain of each color from the gain output units 3322 to 3325 to the characteristic value generating circuit 337a, the characteristic value generating circuit 337a outputs, to the adder 34, the values obtained by multiplying the image data S20 input from the original value output unit 336 by the gains corresponding to the respective colors (e.g. gain Gr×S20) as the characteristic limit values S33a.

The adder 34 adds the image data S20 input from the analog front-end unit 20 and the characteristic limit values S33a (S20+gain Gr×S20).

As described above in detail, in the second embodiment, variation based on the sensitivity ratio can be generated. Also in the second embodiment, effects similar to those of the first embodiment can be achieved.

Third Embodiment

Regarding a third embodiment, points different from the first and second embodiments will be mainly described with reference to FIGS. 9 to 11.

Figure 9:
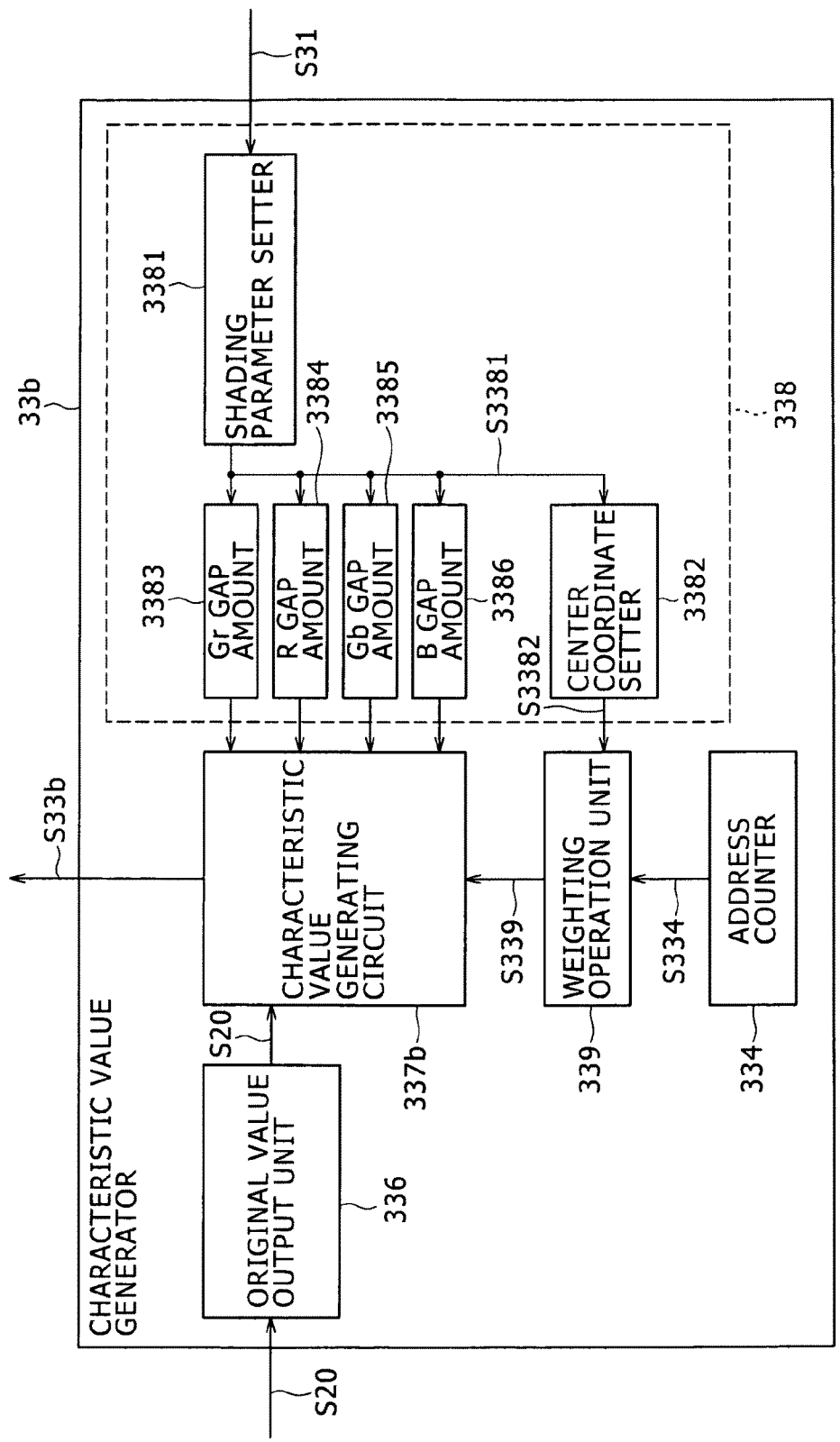
FIG. 9 is a block diagram showing a detailed configuration example of a characteristic value generator according to a third embodiment.

FIG. 9 is a block diagram showing a detailed configuration example of the characteristic value generator according to the third embodiment.

Figure 10:
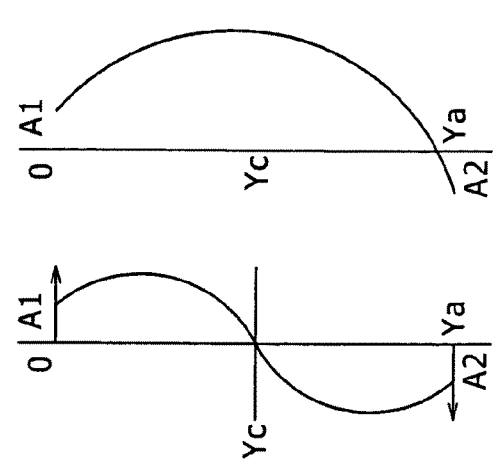
FIG. 10 is a diagram showing one example for explaining a method for setting shading parameters according to the third embodiment.
Figures 10A, 10B, 10C:
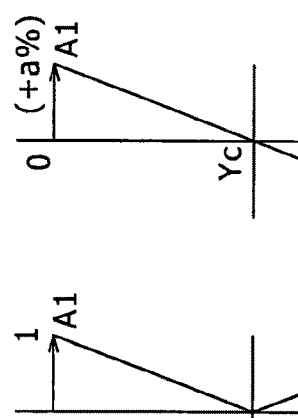
Figures 10D, 10E:
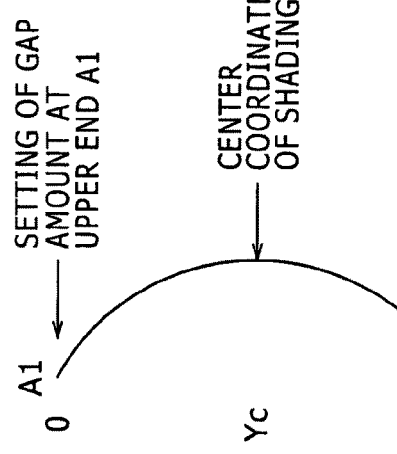

FIG. 10 is a diagram showing one example for explaining a method for setting shading parameters according to the third embodiment.

As shown in FIG. 9, a characteristic value generator 33b is composed of the address counter 334, the original value output unit 336, a shading parameter output unit (extractor) 338, a weighting operation unit (weighting processor) 339, and a characteristic value generating circuit 337b.

In the third embodiment, the characteristic value generator 33b generates shading. The shading refers to shading of the CMOS image sensor 1 attributed to the layout of the pixel circuits in the pixel unit 10 and variation generated in the manufacturing.

Therefore, the characteristic value generator 33b generates not shading that changes in a concentric manner but variation that changes in an offset manner in the X-axis direction and the Y-axis direction.

For simplification of description, suppose that the image data S20 is composed of data of only Y-axis direction components.

The shading parameter output unit 338 is composed of a shading parameter setter 3381, a center coordinate setter (coordinate setter) 3382, and gap amount output units 3383 to 3386.

Upon input of the characteristic value data S31 from the register 32 to the shading parameter setter 3381, the shading parameter setter 3381 sets shading parameters based on the characteristic value data S31. This characteristic value data S31 is data obtained by imaging by the pixel unit 10 and processing by the DSP 40.

The shading parameter setter 3381 extracts the amount of gap between the signal level of the image data S20 and the signal level of the characteristic value data S31 (referred to simply as "gap amount") and sets the ratio of this gap amount as the shading parameter.

(A) of FIG. 10 shows the gap amounts of the image data S20 at e.g. addresses (0, 0), (0, 1), . . . , (0, Ya).

However, the extraction and setting of the gap amount are carried out about two addresses. For example, if address (0, 0) is defined as an upper end A1 and address (0, Ya) is defined as a lower end A2, the shading parameter setter 3381 extracts the gap amount (a %) at the upper end A1 and the gap amount (−b %) at the lower end A2.

The shading parameter setter 3381 outputs, to the center coordinate setter 3382 and the gap amount output units 3383 to 3386, the ratios of the gap amount at the upper end A1 and the lower end A2, set as the shading parameters, as shading parameters S3381.

Upon input of the shading parameters S3381 from the shading parameter setter 3381 to the center coordinate setter 3382, the center coordinate setter 3382 sets the center coordinates of the shading based on the shading parameters S3381, and outputs the center coordinates as a set value S3382 to the weighting operation unit 339.

The center coordinates of the shading correspond to the center of the pixel unit 10 in many cases. As shown in (A) of FIG. 10, the center coordinates of the shading are represented as center coordinates Yc.

Upon input of the shading parameters S3381 from the shading parameter setter 3381 to the gap amount output units 3383 to 3386, the gap amount output units 3383 to 3386 set the shading parameters on a color-by-color basis based on the shading parameters S3381, and output the set values to the characteristic value generating circuit 337b.

At this time, the gap amount output unit 3383 sets the shading parameter about Gr. The gap amount output unit 3384 sets the shading parameter about R. The gap amount output unit 3385 sets the shading parameter about Gb. The gap amount output unit 3386 sets the shading parameter about B.

Upon input of the set value S3382 from the center coordinate setter 3382 to the weighting operation unit 339 and input of the address count value S334 from the address counter 334 to the weighting operation unit 339, the weighting operation unit 339 carries out weighting dependent on the distance from the center coordinates on an address-by-address basis based on Equations (3) and (4) shown below (weighting processing).

(Formula 3)

$$\alpha = -Y/(Yc+1) \quad (3)$$

(if $0 \leq Y \leq Yc$)

(Formula 4)

$$\alpha = Y/(Ya-Yc) - Yc/(Ya-Yc) \quad (4)$$

(if $Yc < Y \leq Ya$)

In Equations (3) and (4), $\alpha$ is the weighting amount (weighting factor). Y corresponds to arbitrary address (0, m). 0 corresponds to the upper end A1 (address (0, 0)). Ya corresponds to the lower end A2 (address (0, Ya)).

As shown in (B) of FIG. 10, the weighting operation unit 339 carries out weighting by linear interpolation for each address in such a way that the weighting is 0 at the center coordinates Yc and the weighting is 1 at the upper end A1 and the lower end A2.

At this time, the weighting operation unit 339 uses Equation (3) for the leg from the upper end A1 to the center coordinates Yc and uses Equation (4) for the leg from the center coordinates Yc to the lower end A2.

The weighting operation unit 339 outputs the weighting amount of each address as an operation result S339 to the characteristic value generating circuit 337.

Upon input of the gap amounts of the respective colors from the gap amount output units 3383 to 3386 to the characteristic value generating circuit 337b and input of the operation result S339 from the weighting operation unit 339 to the characteristic value generating circuit 337b, the characteristic value generating circuit 337b multiplies the ratio of the gap amount and the weighting amount of each address based on Equations (5) and (6) shown below. This multiplication is performed on a color-by-color basis.

(Formula 5)

$$\beta = \alpha \times a \quad (5)$$

(if $0 \leq Y \leq Yc$)

(Formula 6)

$$\beta = \alpha \times (-b) \quad (6)$$

(if $Yc < Y \leq Ya$)

In Equations (5) and (6), $\beta$ is an addition coefficient as the multiplication result. a is the ratio of the gap amount at the upper end A1. b is the ratio of the gap amount at the lower end A2. (C) of FIG. 10 shows the addition coefficient $\beta$.

If a=b and Yc=Ya/2, $\beta$ is a linear equation. If a≠b and Yc≠Ya/2, $\beta$ is a coefficient whose slope changes at the center coordinates Yc.

After the calculation of the addition coefficient $\beta$, the characteristic value generating circuit 337b multiplies the addition coefficient $\beta$ and the image data S20 ($\beta \times$S20) on an address-by-address basis. Thereby, the multiplication value ($\beta \times$S20) of each address, shown in (D) of FIG. 10, is obtained.

The characteristic value generating circuit 337b outputs the multiplication value ($\beta \times$S20) as a characteristic limit value S33b to the adder 34.

The adder 34 adds the image data S20 input from the analog front-end unit 20 and the characteristic limit value S33b (S20+($\beta \times$S20)). Thereby, the addition result shown in (E) of FIG. 10 is obtained.

Figure 11:
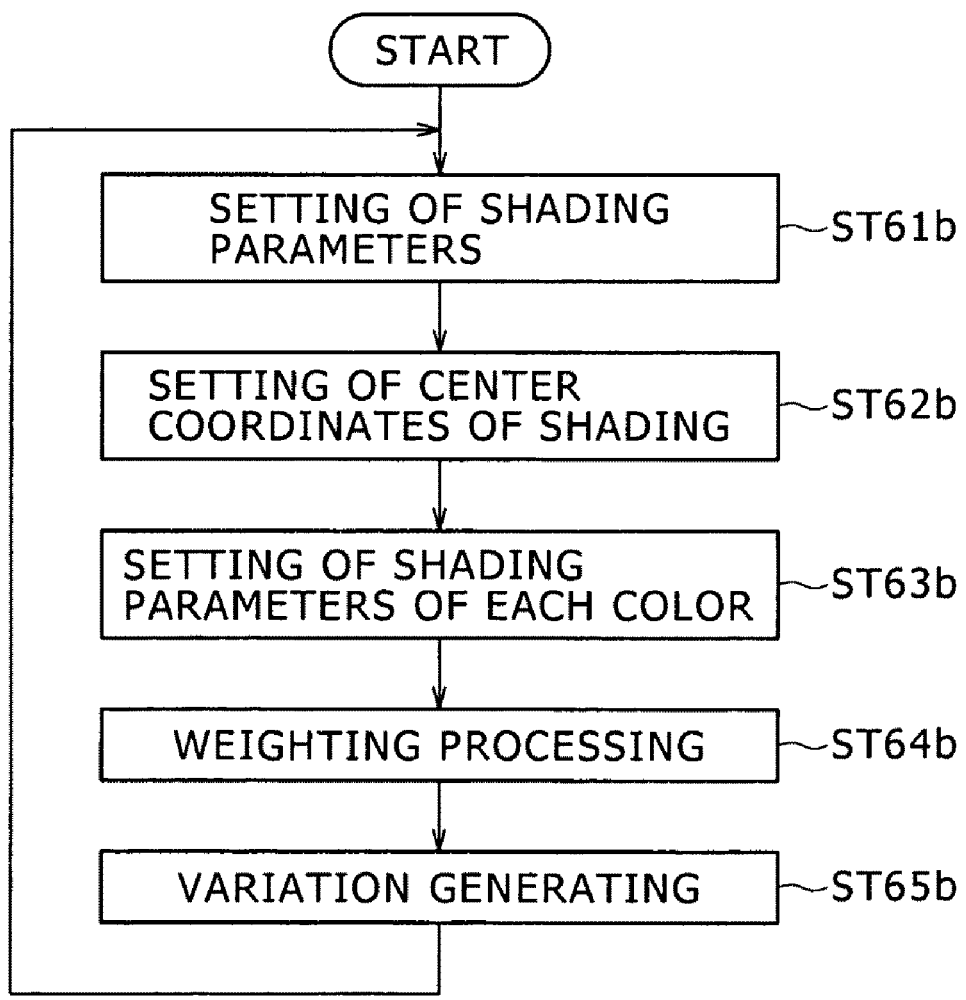
FIG. 11 is a flowchart showing a detailed operation example of the characteristic value generator according to the third embodiment.

FIG. 11 is a flowchart showing a detailed operation example of the characteristic value generator according to the third embodiment.

(Step ST61b)

As shown in FIG. 11, upon input of the characteristic value data S31 from the register 32 to the shading parameter setter 3381, the shading parameter setter 3381 sets shading parameters based on the characteristic value data S31.

The shading parameter setter 3381 outputs, to the center coordinate setter 3382 and the gap amount output units 3383 to 3386, the ratios of the gap amount at the upper end A1 and the lower end A2, set as the shading parameters, as the shading parameters S3381.

(Step ST62b)

Upon input of the shading parameters S3381 from the shading parameter setter 3381 to the center coordinate setter 3382, the center coordinate setter 3382 sets the center coordinates of the shading based on the shading parameters S3381, and outputs the center coordinates as the set value S3382 to the weighting operation unit 339.

(Step ST63b)

Upon input of the shading parameters S3381 from the shading parameter setter 3381 to the gap amount output units 3383 to 3386, the gap amount output units 3383 to 3386 set the shading parameters on a color-by-color basis based on the shading parameters S3381, and output the set values to the characteristic value generating circuit 337b.

(Step ST64b)

Upon input of the set value S3382 from the center coordinate setter 3382 to the weighting operation unit 339 and input of the address count value S334 from the address counter 334 to the weighting operation unit 339, the weighting operation unit 339 carries out weighting dependent on the distance from the center coordinates on an address-by-address basis.

The weighting operation unit 339 outputs the weighting amount of each address as the operation result S339 to the characteristic value generating circuit 337b.

(Step ST65b)

Upon input of the gap amounts of the respective colors from the gap amount output units 3383 to 3386 to the characteristic value generating circuit 337b and input of the operation result S339 from the weighting operation unit 339 to the characteristic value generating circuit 337b, the characteristic value generating circuit 337b multiplies the ratio of the gap amount and the weighting amount of each address to obtain the addition coefficient $\beta$. This multiplication is performed on a color-by-color basis.

After the calculation of the addition coefficient $\beta$, the characteristic value generating circuit 337b multiplies the addition coefficient $\beta$ and the image data S20 ($\beta \times$S20) on an address-by-address basis.

The characteristic value generating circuit 337b outputs the multiplication value ($\beta \times$S20) as the characteristic limit value S33b to the adder 34.

The adder 34 adds the image data S20 input from the analog front-end unit 20 and the characteristic limit value S33b (S20+($\beta \times$S20)).

As described above in detail, in the third embodiment, variation based on shading can be generated. Also in the third embodiment, effects similar to those of the first and second embodiments can be achieved.

In an embodiment of the present invention, for example, it is possible to allow the characteristic value generator according to the first embodiment to encompass the functions of the characteristic value generator according to the second embodiment. Specifically, it is possible to allow the characteristic value generator to generate variation based on the dot defect and the sensitivity ratio.

It should be obvious that the respective embodiments can be so combined that the characteristic value generator can generate variation based on the dot defect, the sensitivity ratio, and shading or can generate only variation based on the sensitivity ratio and shading.

Embodiments of the present invention do not stick to the above-described embodiments but those skilled in the art can make various modifications without departing from the gist of the present invention.

EXPLANATION OF NUMERALS

1 . . . CMOS image sensor, 10 . . . pixel unit, 20 . . . analog front-end unit, amplifier circuit 21, 22 . . . CDS circuit, 23 . . . A/D conversion circuit, 30 . . . variation generating circuit, 31 . . . command receiver, 32 . . . register, 33 . . . characteristic value generator, 34 . . . adder, 35 . . . data processor, 36 . . . format converter, 40 . . . DSP, 331 . . . fixed value extractor, 332 . . . gain extractor, 333 . . . address information extractor, 334 . . . address counter, 335 . . . address determiner, 336 . . . original value output unit, 337 . . . characteristic value generating circuit, 338 . . . shading parameter output unit, 339 . . . weighting operation unit, 3321 . . . sensitivity ratio setter, 3322 to 3325 . . . gain output unit, 3381 . . . shading parameter setter, 3382 . . . center coordinate setter, 3383 to 3386 . . . gap amount output unit

The invention claimed is:

1. A characteristic value generating circuit having:
an acquirer configured to acquire reference data;
a generator configured to refer to the reference data and configured to generate a characteristic value of a limit of correction possibility for input image data; and
an adder that adds the characteristic value generated by the generator and the input image data,
wherein the reference data includes image data obtained by executing predetermined processing for the input image data,
wherein the generator comprises
a coordinate setter configured to set a coordinate of a center of shading of the image data obtained by executing the predetermined processing, and
a weighting processor configured to execute weighting processing dependent on distance from the coordinate set by the coordinate setter,
an extractor configured to extract a gap amount between a signal level of the input image data and a signal level of the image data obtained by executing the predetermined processing, and
an operation unit configured to multiply a result of weighting processing by the weighting processor by a ratio of the gap amount by the extractor.

2. The characteristic value generating circuit according to claim 1, wherein
the extractor extracts a predetermined parameter from the reference data, and
the operation unit performs predetermined operation based on the predetermined parameter extracted by the extractor and the input image data, and outputs a result of the operation to the adder.

3. The characteristic value generating circuit according to claim 2, wherein the reference data includes data relating to a pixel dot defect,
the generator has
an address extractor that extracts an address for which the pixel dot defect should be generated from the reference data, and
a determiner that determines whether or not the pixel dot defect should be generated for an address extracted by the address extractor, and
the operation unit performs operation of generating the pixel dot defect for the address if a determination result by the determiner is a determination result indicating that the pixel dot defect should be generated.

4. The characteristic value generating circuit according to claim 3, wherein
the extractor extracts the data relating to the pixel dot defect that should be generated from the reference data, and
the operation unit performs operation of replacing the input image data by the data relating to the pixel dot defect.

5. The characteristic value generating circuit according to claim 4, wherein
the operation unit carries out addition/subtraction of the data relating to the pixel dot defect to/from the input image data.

6. The characteristic value generating circuit according to claim 5, wherein
the extractor extracts gain from the reference data, and
the operation unit multiplies the input image data by the gain.

7. The characteristic value generating circuit according to claim 6, wherein
the extractor extracts gain of a signal level of each color from the image data obtained by executing the predetermined processing, and
the operation unit multiplies the image data by the gain of each color.

8. The characteristic value generating circuit according to claim 7, wherein
the weighting processor executes weighting processing by linear interpolation for each address in such a way that a weighting amount is 0 at the coordinate of the center of the shading and a weighting amount is the same value at both ends of the shading.

9. An imaging device having:
a pixel unit configured to convert incident light to a charge by photoelectric conversion;
a characteristic value generating circuit configured to generate a limit value of a characteristic of the pixel unit; and
a signal processor configured to execute predetermined processing for an output signal of the pixel unit and configured to output a processing result as input image data to the characteristic value generating circuit, wherein
the characteristic value generating circuit has
an acquirer configured to acquire reference data,
a generator configured to refer to the reference data and configured to generate a characteristic value of a limit of correction possibility for input image data, and
an adder configured to add the characteristic value generated by the generator and the input image data,
wherein the reference data includes image data obtained by executing predetermined processing for the input image data,
wherein the generator comprises
a coordinate setter configured to set a coordinate of a center of shading of the image data obtained by executing the predetermined processing, and a weighting processor configured to execute weighting processing dependent on distance from the coordinate set by the coordinate setter, an extractor configured to extract a gap amount between a signal level of the input image data and a signal level of the image data obtained by executing the predetermined processing, and an operation unit configured to multiply a result of weighting processing by the weighting processor by a ratio of the gap amount by the extractor.

10. The imaging device according to claim 9, wherein the reference data includes data relating to a pixel dot defect in the pixel unit, the generator has an address extractor that extracts an address for which the pixel dot defect should be generated from the reference data, and a determiner that determines whether or not the pixel dot defect should be generated for an address extracted by the address extractor, and the operation unit performs operation of generating the pixel dot defect for the address if a determination result by the determiner is a determination result indicating that the pixel dot defect should be generated.

11. The imaging device according to claim 10, wherein the extractor extracts gain of a signal level of each color from the image data obtained by executing the predetermined processing, and the operation unit multiplies the image data by the gain of each color.

12. The characteristic value generating circuit according to claim 2, wherein the extractor extracts gain of a signal level of each color from the image data obtained by executing the predetermined processing, and the operation unit multiplies the image data by the gain of each color.

13. The imaging device according to claim 9, wherein the extractor extracts gain of a signal level of each color from the image data obtained by executing the predetermined processing, and the operation unit multiplies the image data by the gain of each color.

\* \* \* \* \*